(12) United States Patent
Kim (10) Patent No.: US 6,510,051 B2
(45) Date of Patent: Jan. 21, 2003

(54) DOCKING APPARATUS FOR ASSEMBLING AND DISASSEMBLING PERIPHERAL DEVICES IN AND FROM A COMPUTER

(75) Inventor: Tae-Woan Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 52 days.

(21) Appl. No.: 09/853,759

(22) Filed: May 14, 2001

(65) Prior Publication Data

US 2002/0030970 A1 Mar. 14, 2002

(30) Foreign Application Priority Data

Sep. 14, 2000 (KR) ........................................ 2000-54062

(51) Int. Cl.[7] ................................................. G06F 1/16
(52) U.S. Cl. ................. 361/686; 439/928.1; 360/98.01; 312/223.2
(58) Field of Search ................................ 361/686, 683, 361/724–727; 439/928.1; 360/137, 97.01, 98.01; 364/78.1; 312/223.1–223.2

(56) References Cited

U.S. PATENT DOCUMENTS

| | | | |
|---|---|---|---|
| 5,552,959 A | | 9/1996 | Penniman et al. ........... 361/686 |
| 5,619,397 A | | 4/1997 | Honda et al. ................ 361/686 |
| 5,619,398 A | * | 4/1997 | Harrison et al. ............. 361/686 |
| 5,740,012 A | | 4/1998 | Choi ........................... 361/686 |
| 5,784,253 A | | 7/1998 | Ooka et al. .................. 361/686 |
| 5,812,370 A | | 9/1998 | Moore et al. ................ 361/684 |
| 5,825,616 A | * | 10/1998 | Howell et al. ............... 361/684 |
| 5,966,285 A | | 10/1999 | Sellers ........................ 361/686 |
| 5,991,838 A | | 11/1999 | Swindler et al. ............. 710/101 |
| 6,011,687 A | | 1/2000 | Gluskoter et al. ........... 361/686 |
| 6,034,869 A | * | 3/2000 | Lin .............................. 361/686 |
| 6,069,790 A | | 5/2000 | Howell et al. ............... 361/686 |
| 6,185,095 B1 | | 2/2001 | Helot et al. .................. 361/686 |
| 6,366,458 B1 | * | 4/2002 | Yoshida et al. .............. 361/686 |

* cited by examiner

Primary Examiner—Darren Schuberg
Assistant Examiner—Hung Van Duong
(74) Attorney, Agent, or Firm—Robert E. Bushnell, Esq.

(57) ABSTRACT

A docking apparatus for use in assembling and disassembling peripheral devices from a computer, disposed in a housing of the computer, including a unit for releasing a locking state, a unit for separating a connector of the peripheral device from a mating connector in the housing, and a unit for pushing out the peripheral device to an easily separable or removable position. The docking apparatus releases a locking state of the docking apparatus and pushes out automatically the peripheral devices to an easily separable or removable position by a single switching operation.

27 Claims, 7 Drawing Sheets

DOCKING APPARATUS FOR ASSEMBLING AND DISASSEMBLING PERIPHERAL DEVICES IN AND FROM A COMPUTER

CLAIM OF PRIORITY

This application makes reference to, incorporates the same herein, and claims all benefits accruing under 35 U.S.C. §119 from an application entitled Docking Mechanism Used for Assembling/Disassembling Peripheral Device of Computer earlier filed in the Korean Industrial Property Office on Sep. 14, 2000, and there duly assigned Serial No. 2000-54062 by that Office.

BACKGROUND OF THE INVENTION

1. Field of the Invention

The present invention relates to a docking apparatus for use in assembling and disassembling peripheral devices from a computer, and more particularly to a docking apparatus for use in assembling and disassembling peripheral devices from a computer which can release a locking state thereof and push out automatically the peripheral devices to an easily separable or removable position, by one switching operation.

2. Description of the Background Art

In a desktop computer, a case or housing is generally designed to be easily opened to assemble or disassemble peripheral devices such as a compact disc read-only memory (CD-ROM) device, a hard disk drive, and a floppy disk drive since they are secured in the housing. However, in a portable computer, a housing is designed to be able to assemble or disassemble peripheral devices at the outside of the portable computer. Particularly, a light-weight portable computer is designed to selectively assemble or disassemble one or two from the compact disc read-only memory device, the hard disk drive, and the floppy disk drive according to uses or needs. Recently, portable computers having a separable docking station able to assemble or disassemble peripheral devices from the outside are coming out.

In order to assemble or disassemble the peripheral devices in the docking station or a main body of the portable computer, a docking apparatus is generally used. Of the conventional docking apparatus, there are proposed docking apparatus designed for a user to release a locking state by using one hand and removing the peripheral devices by using of the other hand. However, these docking apparatus have a problem that the main body of the portable computer has to be held to remove the peripheral devices. The reason for this is that the peripheral devices are ejected by releasing the docking apparatus, but the length of the ejected portion thereof is not enough to allow a user to easily remove the peripheral devices. Thus, in case the length of the ejected portion, i.e., ejected distance of the peripheral devices is very small, a user is inconvenienced by having to release a locking state by using one hand and removing the peripheral devices by using the other hand.

A docking apparatus for use in a computer is disclosed in U.S. Pat. No. 6,069,790 by Howell et al., for Portable Computer Ejection Mechanism for Docking Devices. The docking apparatus disposed in an opened docking station uses an eject finger for ejecting a computer system and a hook end for engaging with a slot in the computer system in order to disassemble or assemble the computer system. The docking apparatus does not have the problem due to the ejected distance as described above since the portable computer is assembled or disassembled in the opened docking station. However, if the docking apparatus is applied not to the opened docking station but a slotted docking station, the problem due to the ejected distance will also occur.

Further exemplars of the art are U.S. Pat. No. 6,185,095 B1 by Helot et al., for Computer Docking Station with Retractable Release Lever, U.S. Pat. No. 6,011,687 by Gluskoter et al., for Docking Station Adapter for Computer Media Modules, U.S. Pat. No. 5,784,253 by Ooka et al., for Docking Station Including Ejection Lever Located under Computer Mounted on Docking Station And Cover Held Closed by Portion Extending under Computer, U.S. Pat. No. 5,552,959 by Penniman et al., for Notebook Computer Docking Station Having Floating Connector Interface Structure, U.S. Pat. No. 5,991,838 by Swindler et al., for Motorized Portable Computer/Expansion Chassis Docking System, U.S. Pat. No. 5,812,370 by Moore et al., for Media Eject Mechanism, U.S. Pat. No. 5,966,285 by Sellers, for Mobile Portable Computer Docking/Office Station, and U.S. Pat. No. 5,619,397 by Honda et al., for Electronic Device System Including A Portable Electronic Device Having A Handwriting Input Device Locked to An Expansion Station When The Power Switch of The Portable Electronic Device is Turned on.

SUMMARY OF THE INVENTION

It is therefore an object of the present invention to provide an improved docking apparatus for use in assembling and disassembling peripheral devices from a computer which can remove the peripheral devices by one switching operation, thereby improving usefulness and convenience of the computer.

It is another object of the present invention to provide an improved docking apparatus for use in assembling and disassembling peripheral devices from a computer which can push out automatically the peripheral devices to an easily removable or separable position by one switching operation, thereby rapidly removing the peripheral devices.

It is yet another object of the present invention to provide an improved docking apparatus for use in assembling and disassembling peripheral devices from a computer, having a pusher which can assist to carry out a switching operation by using of a relatively small force.

These and other objects are provided, according to the present invention, by a docking apparatus for use in assembling and disassembling peripheral devices from a computer, disposed in a housing of the computer, including a unit for engaging or releasing the peripheral device in or from a locking state in cooperation with corresponding locking portion of the peripheral device, a unit for separating a connector of the peripheral device from a mating connector in the housing when the peripheral device is released, and a unit for pushing out the peripheral device to an easily separable or removable position when or after the connector of the peripheral device is separated from the mating connector in the housing. The engaging or releasing unit includes a knob mount formed on the inner surface of the housing, a locking link assembled movably with a knob mount on the housing, having a hook formed in one of the walls of the housing, a knob formed on an upper surface of the housing and a first projection extended from a bottom surface of the housing, and a knob spring disposed to have one end to be supported on the locking link. The separating unit having a link pusher assembled movably with the locking link, having a second projection on one end of the separating unit, a first extended portion on the other end of the separating unit and a connecting hole for receiving the first projection on a center portion the separating unit, a link having a link pusher connecting hole for receiving the second projection, a pivot pin mounting hole for receiving a pivot pin formed to project from an inner surface of the housing, an eject finger and a spring hanger, and a link spring hanged on the spring hanger at one end of the spring hanger and secured on the housing at the other end thereof.

The pushing unit including a pusher mount formed in the housing, a pusher assembled movably with the pusher mount, having a pushing member formed on one end of pushing unit and a second extended portion formed on the other end pushing unit, and a pusher spring disposed on the second extended portion to have one end of the pusher spring to be supported on the pusher mount.

A docking apparatus in accordance with the present invention can be applied to a portable computer. The portable computer includes a main body having a keyboard and a monitor, a docking station connected the main body for receiving peripheral devices, and a docking apparatus disposed in the docking station including a unit for engaging or releasing the peripheral device in or from a locking state in cooperation with corresponding locking portion of the peripheral device, a unit for is separating a connector of the peripheral device from a mating connector in the docking station when the peripheral device is released, and a unit for pushing out the peripheral device to an easily separable or removable position when or after the connector of the peripheral device is separated from the mating connector in the docking station.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which reference symbols indicate the same or similar components, wherein.

DETAILED DESCRIPTION OF PREFERRED EMBODIMENTS

Figure 1:
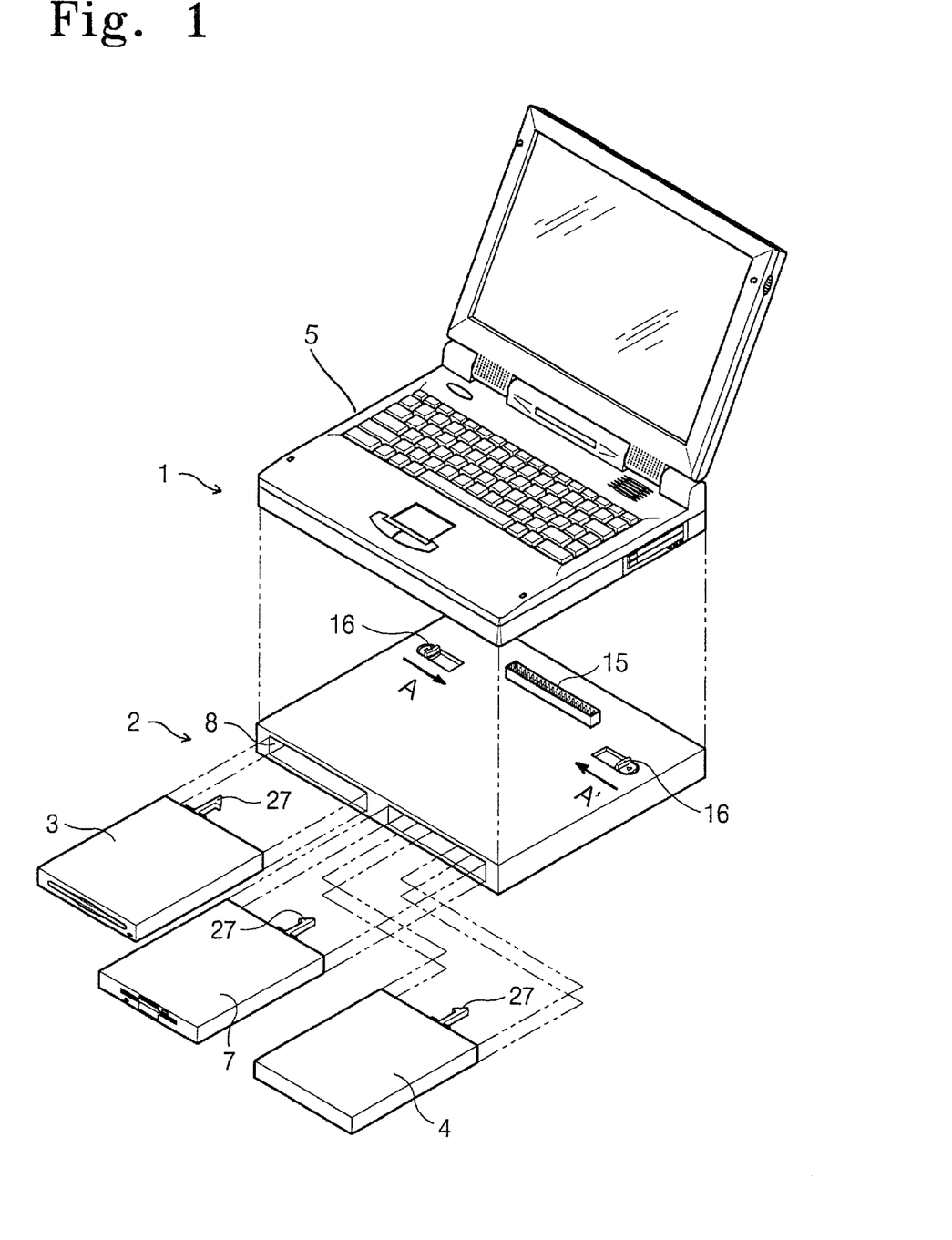
FIG. 1 is a perspective view illustrating a docking apparatus in accordance with the present invention which is applied to a docking station of a portable computer.
Figure 3:
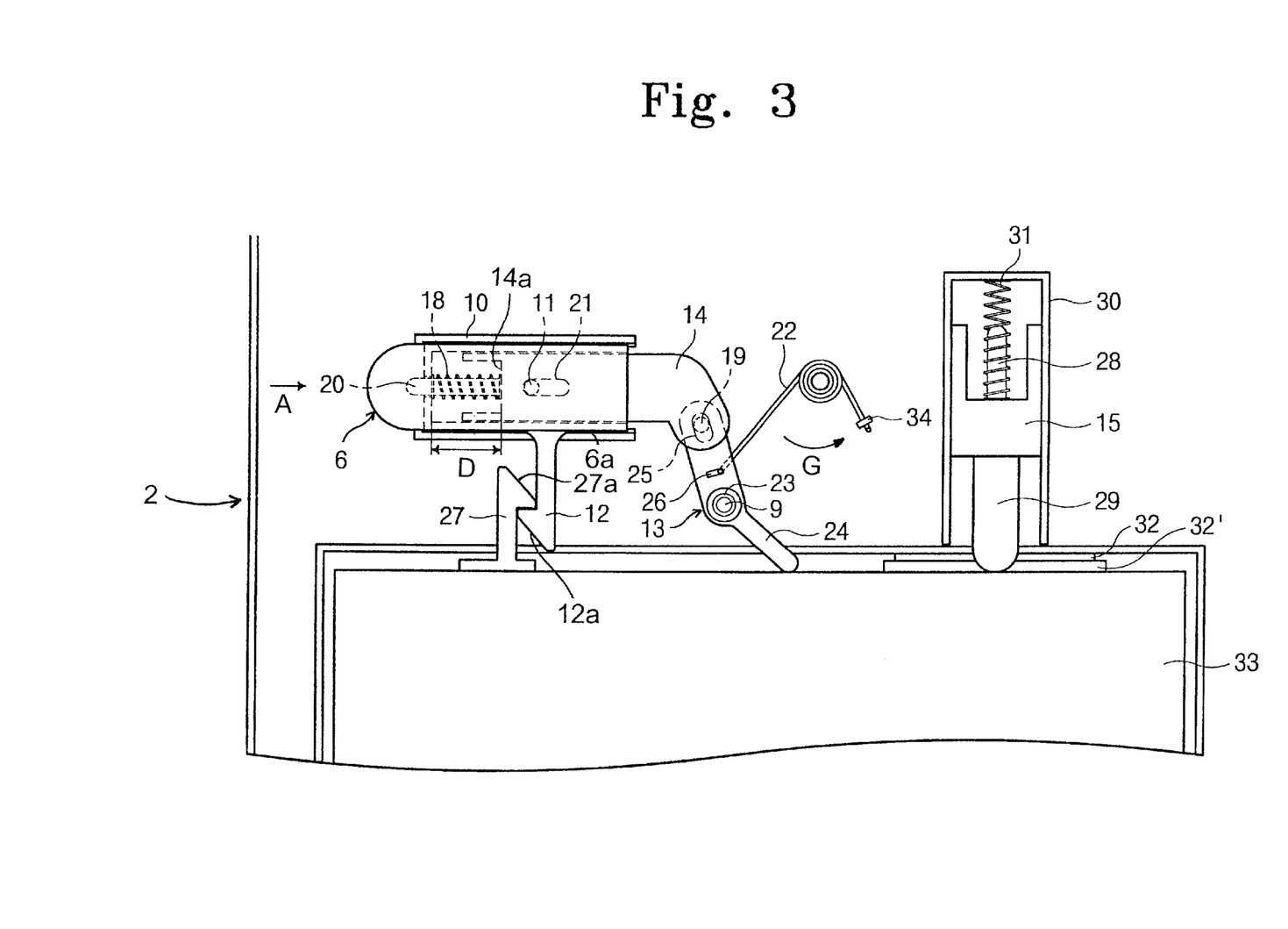
FIG. 3 is a partial top plan view showing the docking apparatus in accordance with one embodiment of the present invention which is in a locking state.

Turning now to the drawings, as shown in FIG. 1, a docking apparatus of the present invention is applied to a docking station 2 of a portable computer 1. The docking station 2 is connected with a main body 5 of a portable computer 1 through a docking connector 15. A peripheral device 33 such as a compact disc read-only memory device 3, or a hard disk drive 4, a floppy disk drive 7 is selectively inserted in one of the mounting grooves 8 according to uses or needs. When the peripheral device 33 is inserted or assembled in the mounting groove 8, it is automatically locked on the docking apparatus. However, when the peripheral device 33 is ejected or disassembled from the mounting groove 8, it is unlocked by operation of switching the docking apparatus. The switching operation is carried out by moving a knob 16 exposed on the outside of the docking station, in direction A and A' as shown in FIGS. 1 and 3. The peripheral device 33 has a locking member 27 for engaging with corresponding portion of the docking apparatus, i.e., a hook 12 which will be described below.

Referring now to FIG. 3, the docking apparatus in accordance with one embodiment of the present invention includes a locking link 6, a link pusher 14, a link 13, a link spring 22 having a torsion spring and a pusher 15.

Figure 2:
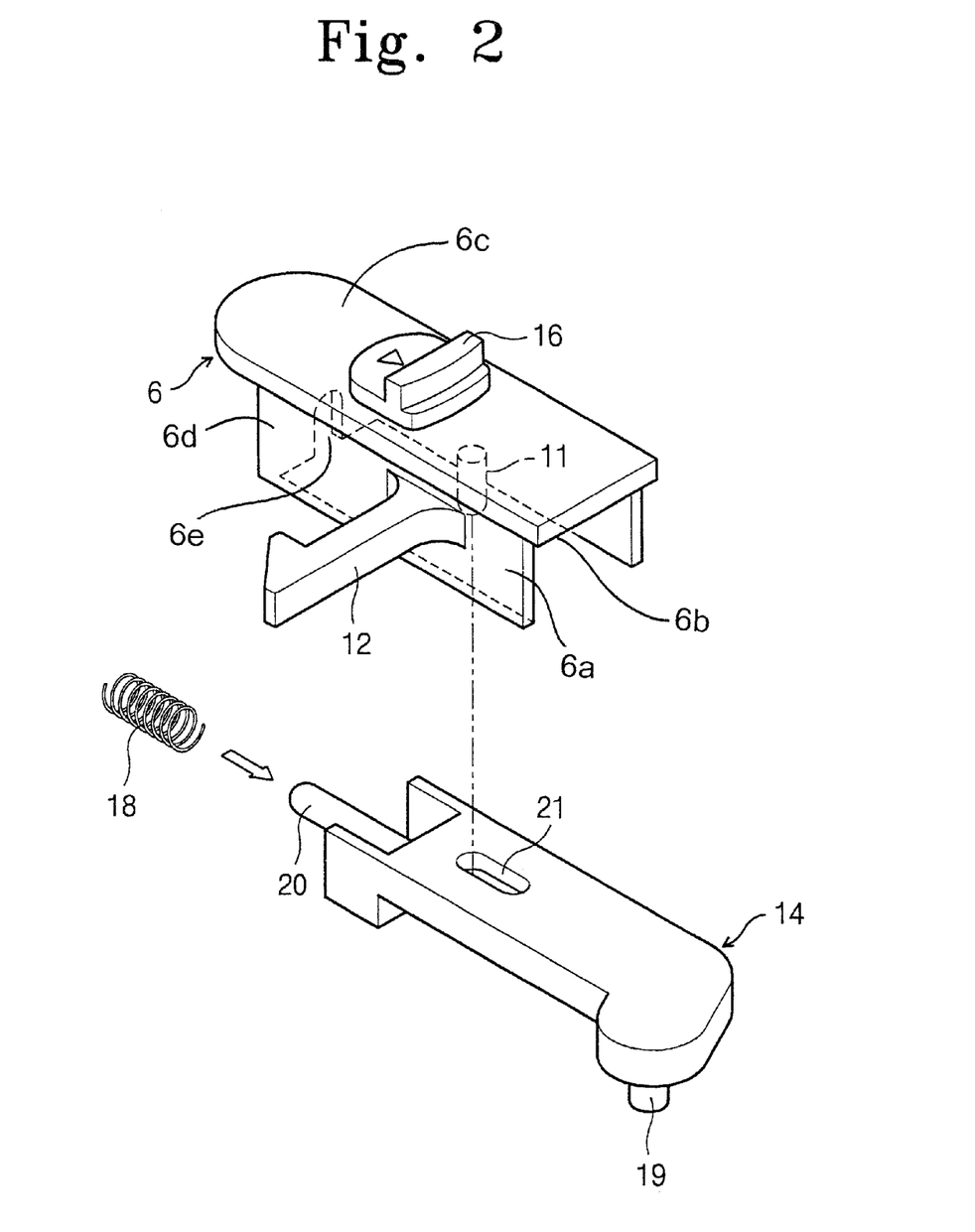
FIG. 2 is a perspective view of a locking link and a link pusher of the docking apparatus in accordance with the present invention.

The locking link 6 of the docking apparatus of the present invention are assembled movably with the link pusher 14, and along with the link pusher 14, mounted on a knob mount 10 which is formed in the housing of the docking station 2. The locking link 6 has a knob 16 on an upper surface 6c of the locking link 6, a hook 12 projected from one of the walls 6a of the locking link 6, and a first projection 11 on a bottom surface 6b of the locking link 6, as shown in FIG. 2.

The link pusher 14 of the docking apparatus of the present invention has a second projection 19 formed on one end of the link pusher 14, a first extended portion 20 of an elongated cylinder shape on the other end of the link pusher 14, and an elongated connecting hole 21 formed on a center portion of the link pusher 14 for receiving the first projection 11. On the first extended portion 20 of the link pusher 14, a knob spring 18 having a coil spring is disposed. Accordingly, when the locking link 6 along with the link pusher 14 are mounted on the knob mount 10, the locking link 6 and the link pusher 14 can be elastically supported to move relative to each other as much a distance which the first projection 11 is able to move through the elongated connecting hole 21.

The link 13 of the docking apparatus of the present invention has a pivot pin mounting hole 23 formed on a center portion of the link 13, an eject finger 24 on one half of the link 13, a spring hanger 26 for securing the link spring 22 and a link pusher connecting hole 25 formed on the other half of the link 13. The pivot pin mounting hole 23 of the link 13 receives a pivot pin 9 formed in the housing of the docking station 2. The link 13 pivots on the housing of the docking station 2 through the pivot pin 9. The link spring 22, both ends of which are connected respectively with the spring hanger 26 and a spring securing portion 34 formed in the housing of the docking station 2, urges elastically the link 13 to move in the counterclockwise direction G. The link pusher connecting hole 25 receives the second projection 19 to move the link pusher 14 when the eject finger 24 is pushed by the peripheral device 33, or the eject finger 24 when the link pusher 14 is moved in the direction A by the knob 16 of the locking link 6.

The pusher 15 of the docking apparatus of the present invention has a second extended portion 28 on one end of the pusher 15, and a pushing member 29 having a spherical shaped end on the other end of the pusher 15. On the second extended portion 28 of the pusher 15, a pusher spring 31 having a coil spring is disposed to be supported on a pusher mount 30 formed in the housing of the docking station 2. The link spring 22 has spring constant k larger than the spring constant k' of the knob spring 18. Therefore, the following expression would hold, k>k'. The reason for this is that when the knob 16 is moved, the hook 12 has to be first unlocked before the link 13 is rotated.

Operation of a docking apparatus in accordance with the present invention will now be described with reference to FIG. 3 to FIG. 6.

In disassembling (or disconnecting) a peripheral device 33 such as a compact disc read-only memory device 3 from one of the mounting grooves 8 of a docking station 2, operation of the docking apparatus of the present invention includes the steps of releasing a locking state, separating a connector 32' of the peripheral device 33 from a mating connector 32 of a docking station 2, and pushing out the peripheral device 33 to an easily separable or removable position.

Supposing that the docking apparatus of the present invention is in a locking state, a locking member 27 of a peripheral device 33 is maintained to be engaged with a hook 12 of a locking link 6 by an elastic force of a knob spring 18 and a link spring 22 as shown in FIG. 3. In the locking state, a locking link 6 is positioned to have a first projection 11 of the locking link 6 to be moved to a left portion of an elongated connecting hole 21 of a link pusher 14. Namely, there is a distance D between a wall 6d of the locking link 6 and a wall 14a of the link pusher 14 where a first extended portion 20 formed on link pusher 14 can go through an opening 6e formed on the locking link 6. A length of the knob spring 18 is maximized as seen in FIG. 3.

Figure 4:
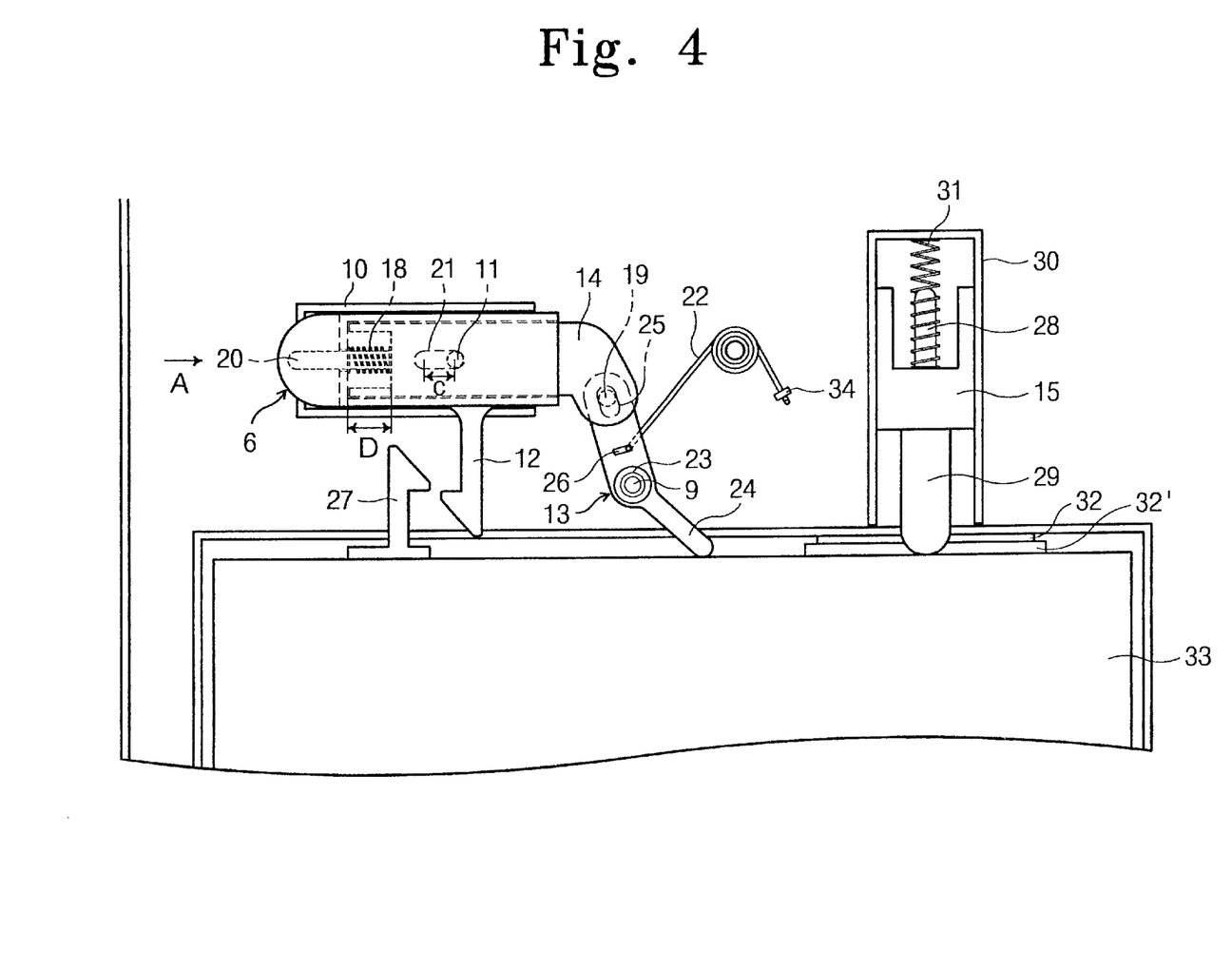
FIG. 4 is a partial top plan view of the docking apparatus in accordance with the present invention showing a state that a hook is released when a knob of a locking link is moved as much as a distance C in a direction A from a position shown in FIG. 3.

FIG. 4 is a partial top plan view showing the step of releasing the locking state of the docking apparatus. Referring to FIG. 4, in order to release the locking state, the locking link 6 is moved in the direction A as much as a distance C, i.e., a length of the elongated connecting hole 21 by operation of switching a knob 16. As a result, the first projection 11 of the locking link 6 is moved to a right portion of the elongated connecting hole 21 of the link pusher 14. At this time, the distance D or the length of the knob spring 18 is minimized as seen in FIG. 4.

Figure 5:
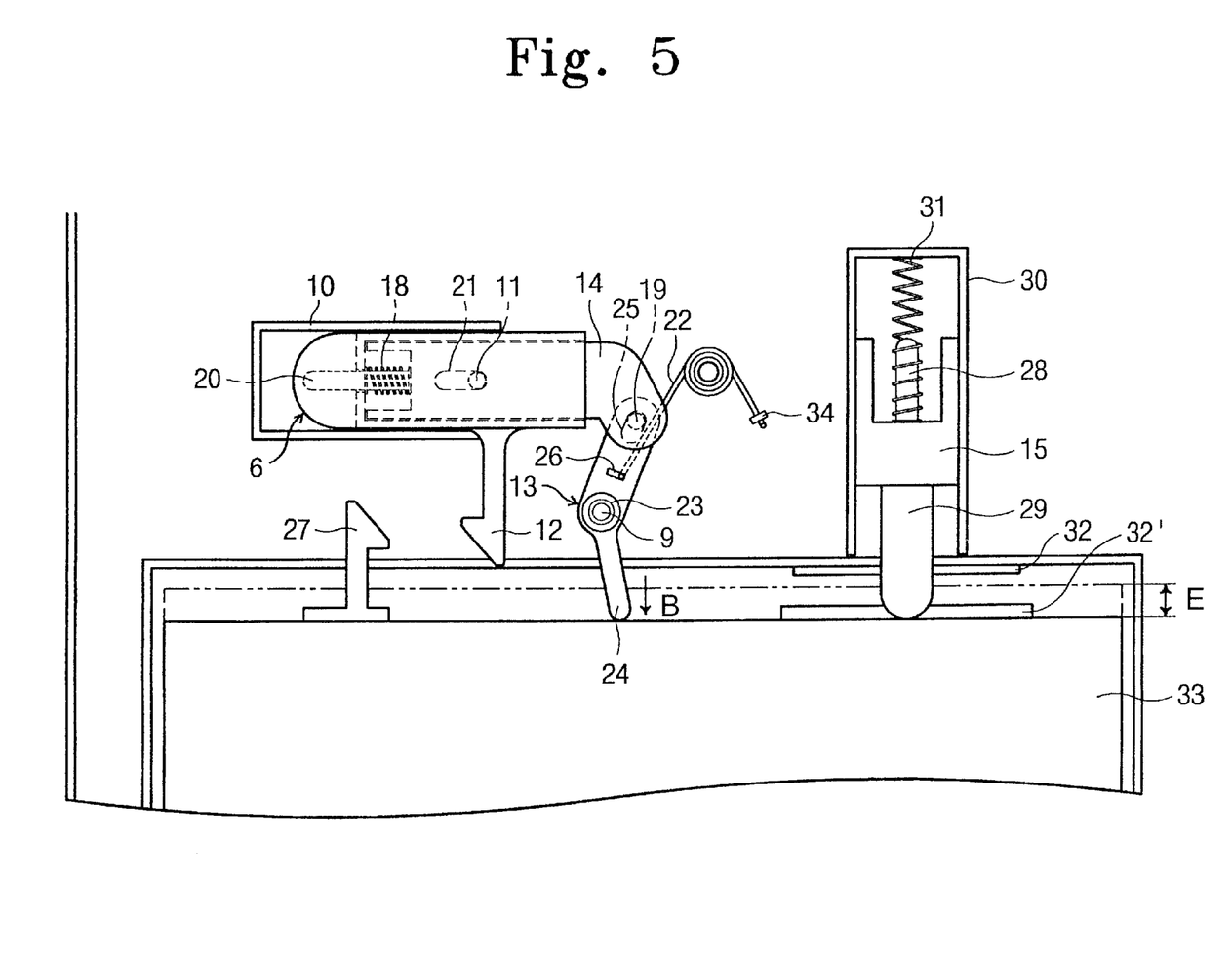
FIG. 5 is a partial top plan view of the docking apparatus in accordance with the present invention showing a state that a connector of the peripheral device is separated from a mating connector of the docking station by an eject finger when the knob is moved from a position shown in FIG. 4 to a movement limit position.

FIG. 5 shows the step of separating the connector 32' of the peripheral device 33 from the mating connector 32 of the docking station 2. In this step, the first projection 11 of the locking link 6 is further moved in the direction A to a movement limit position, to push the right portion of the elongated connecting hole 21 of the link pushing portion 14. As a result, a second projection 19 of the link pusher 14 is pushed to make the link 13 to be rotated on a pivot pin 9. As the link 13 is rotated, an eject finger 24 pushes the peripheral device 33 in a direction B as shown in FIG. 5. At this time, a pushing member 29 of a pusher 15 also pushes the peripheral device 33 not enough to separate the connector 32' from the mating connector 32, but to assist operation of the eject finger 24. Thus, the peripheral device 33 can be moved in the direction B as much as a distance E to separate the connector 32' of the peripheral device 33 from the mating connector 32 of the docking station 2. The combined force of the pushing member 29 and the eject finger 24 help force the separation.

Figure 6:
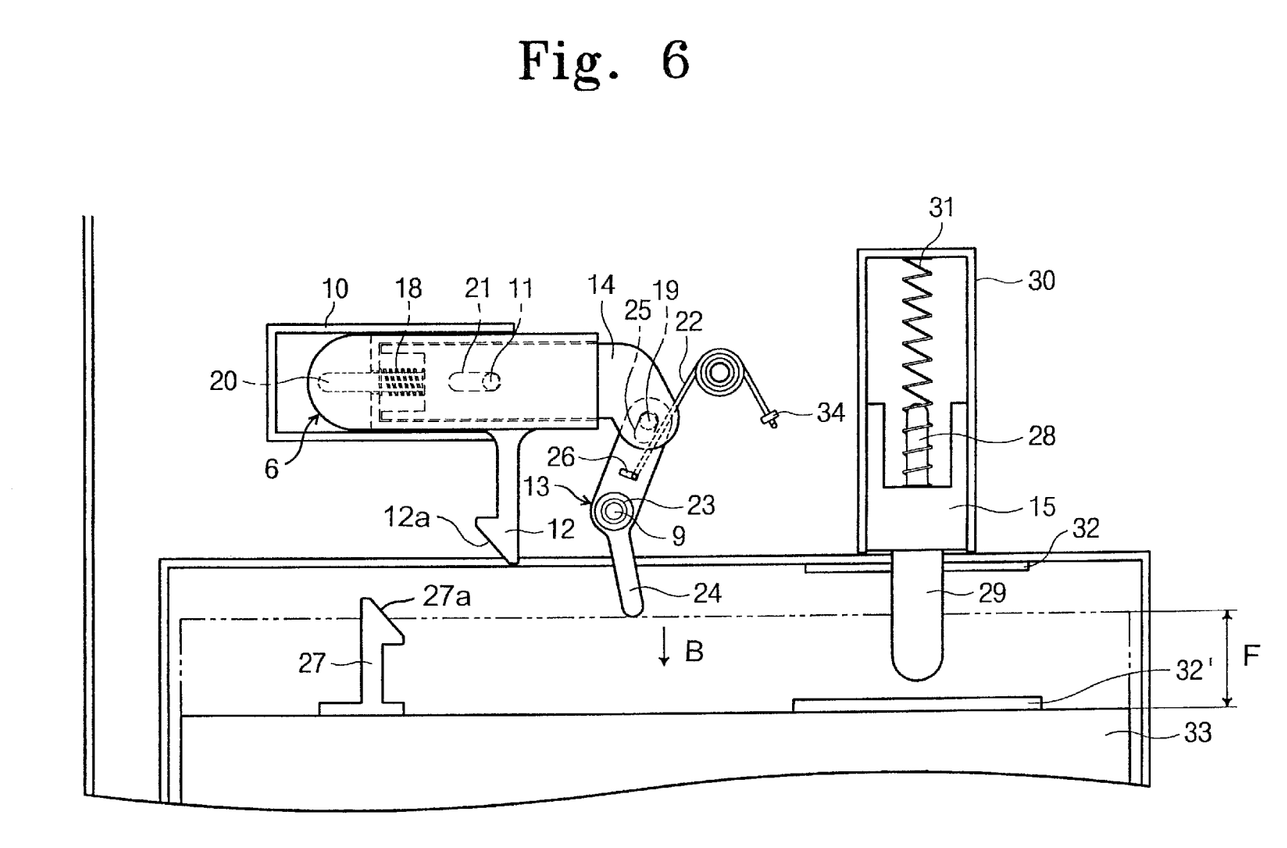
FIG. 6 is a partial top plan view of the docking apparatus in accordance with the present invention showing a state that the peripheral device is completely pushed out by a pushing member of a pusher.

Referring to FIG. 6, after the connector 32' is separated from the connector 32, the peripheral device 33 is further moved in the direction B as much as a distance F by means of the pushing member 29 of the pusher 15 to have a portion thereof to be pushed out and projected outside. A length of the projected portion of the peripheral device 33 is 10 mm to 20 mm (millimeters) according to the spring constant of the pusher spring 31. After ejection of the peripheral device 33 is finished, the locking link 6, the link pusher 14, and the link 13 of the docking apparatus are elastically returned to a beginning position as shown in FIG. 3 by elastic force of the link spring 22 and the knob spring 18.

In inserting the peripheral device 33 into the mounting grooves 8 of the docking station 2, operation of the docking apparatus of the present invention includes the step of engaging the locking member 27 of the peripheral device 33 with the hook 12 of the locking link 6.

In the engaging step, the peripheral device 33 is inserted in the mounting groove 8 without any operation of switching the knob 16. As the peripheral device 33 is almost inserted, an inclined surface of the locking member 27 contacts and pushes an inclined surface of the hook 12 to make the locking link 6 to be elastically moved in the direction A. At this time, the pushing member 29 of the pusher 15 is also pushed by a front surface of the peripheral device 33. After inserting of the peripheral device 33 is finished, the locking link 6 is elastically returned in the beginning position as shown in FIG. 3 by the elastic force of the link spring 22 to make the locking member 27 to be engaged with the hook 12.

Figure 7:
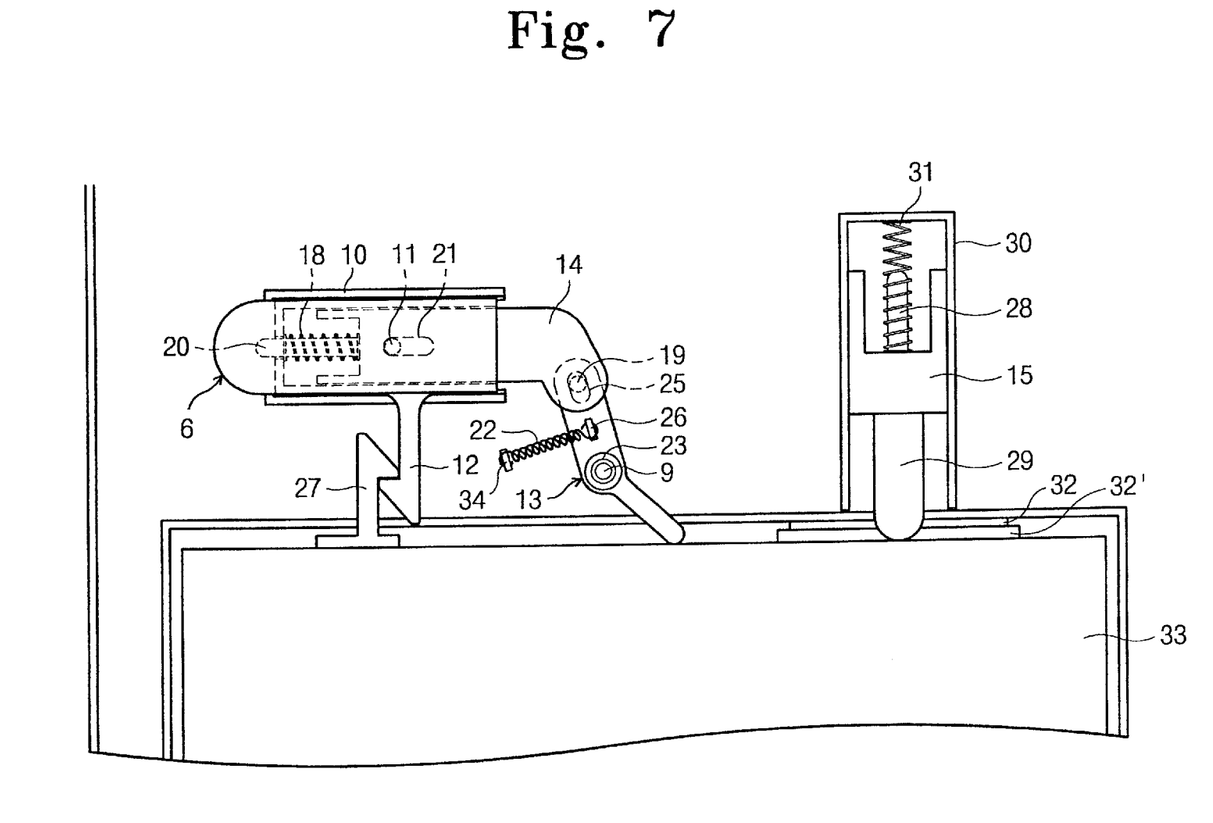
FIG. 7 is a partial top plan view showing a docking apparatus of another embodiment of the present invention.

FIG. 7 is a partial top plan view showing a docking apparatus of another embodiment of the present invention. A structure of the docking apparatus is the same as that of the docking apparatus shown in FIG. 3 to FIG. 6 except that the link spring 22 is a coil spring. By using the coil spring, a structure of this docking apparatus can be more simplified compared with that of the as docking apparatus in FIG. 3 using a torsion spring.

As apparent from the foregoing description, it can be appreciated that the present invention provides a docking apparatus for use in assembling and disassembling peripheral devices from a computer which can remove the peripheral devices by one switching operation, thereby improving usefulness and convenience of the computer system. Particularly, the docking apparatus of the invention can push out automatically the peripheral devices to an easily separable or removable position by one switching operation, thereby speedily removing them.

Also, the present invention provides a docking apparatus having a pusher that can assist to carry out a switching operation by using of a relatively small force.

In the drawings and specification, there has been disclosed typical preferred embodiments of the invention and, although specific terms are employed, they are used in a generic and descriptive sense only and not for the purpose of limitation, the scope of the invention being set forth in the following claims. For example, in the specification, the docking apparatus of the invention is explained as it is applied to a docking station of a portable computer, but it can be also applied to a main body of a portable computer or a desktop computer.

What is claimed is:

1. A docking apparatus for use in assembling and disassembling peripheral devices from a computer, said docking apparatus being disposed in a housing of said computer, comprising:

a pivot pin projecting from an inner surface of said housing;

a knob mount forming on said inner surface of said housing;

a locking link being assembled movably with said knob mount, said locking link having a hook formed in a wall of said locking link, a knob formed on an upper surface of said locking link, and a first projection extended from a bottom surface of said locking link;

a link pusher being assembled movably with said locking link, said link pusher having a second projection on one end of said link pusher, a first extended portion on the other end of said link pusher, and a connecting hole receiving said first projection on a center portion of said link pusher;

a link having a link pusher connecting hole receiving said second projection, a pivot pin mounting hole receiving said pivot pin, an eject finger and a spring hanger;

a link spring hanging on said spring hanger at one end of said link spring and secured on said housing at the other end of said link spring; and a knob spring being disposed on said first extended portion to have one end of said knob spring to be supported on said locking link.

2. The docking apparatus according to claim 1, further including:

a pusher mount being formed in said housing;

a pusher being assembled movably with said pusher mount, said pusher having a pushing member on one end of said pusher and a second extended portion on the other end of said pusher; and a pusher spring being disposed on said second extended portion to have one end of said pusher spring being supported on said pusher mount.

3. The docking apparatus according to claim 1, with said link spring being a torsion spring.

4. The docking apparatus according to claim 1, with said link spring being a coil spring.

5. The docking apparatus according to claim 1, with said link spring having a spring constant larger than a spring constant of said knob spring.

6. The docking apparatus according to claim 2, with said link spring being a torsion spring.

7. The docking apparatus according to claim 2, with said link spring being a coil spring.

8. The docking apparatus according to claim 2, further comprising a projection of said peripheral device locking with said hook of said locking link.

9. The docking apparatus according to claim 8, with said projection of said peripheral device having a length between 10 millimeters to 20 millimeters depending on a spring constant of said pusher spring.

10. A portable computer, comprising:

a main body;

a docking station being connected with said main body for receiving peripheral devices;

a pivot pin being formed to project from an inner surface of said docking station;

a knob mount being formed on said inner surface of said docking station;

a locking link being assembled movably with said knob mount, said locking link having a hook formed in a wall of said locking link, a knob formed on an upper surface of said locking link, and a first projection extended from a bottom surface of said locking link;

a link pusher being assembled movably with said locking link, said link pusher having a second projection on one end of said link pusher, a first extended portion on the other end of said link pusher, and a connecting hole receiving said first projection on a center portion of said link pusher;

a link having a link pusher connecting hole receiving said second projection, a pivot pin mounting hole receiving said pivot pin, an eject finger, and a spring hanger;

a link spring hanging on said spring hanger at one end of said link spring and secured on said docking station at the other end of said link spring; and a knob spring being disposed on said first extended portion to have one end of said knob spring to be supported on said locking link.

11. The portable computer according to claim 10, further comprising:

a pusher mount being formed in said docking station;

a pusher being assembled movably with said pusher mount, said pusher having a pushing member on one end of said pusher and a second extended portion on the other end of said pusher; and a pusher spring disposed on said second extended portion to have one end of said pusher spring to be supported on said pusher mount.

12. The docking apparatus according to claim 10, with said link spring being a torsion spring.

13. The docking apparatus according to claim 10, with said link spring being a coil spring.

14. The docking apparatus according to claim 11, with said link spring being a torsion spring.

15. The docking apparatus according to claim 11, with said link spring being a coil spring.

16. A docking apparatus for use in assembling and disassembling peripheral devices from a computer, disposed in a housing of said computer, comprising:

means for engaging or releasing said peripheral device in or from a locking state in cooperation with corresponding locking portion of said peripheral device;

means for separating a connector of said peripheral device from a mating connector in said housing when said peripheral device is released; and means for pushing out said peripheral device to an easily separable or removable position when or after said connector of said peripheral device is separated from said mating connector in said housing.

17. The docking apparatus according to claim 16, with said engaging or releasing means comprising:

a knob mount being formed on said inner surface of said housing;

a locking link being assembled movably with a knob mount on said housing, said locking link having a hook formed in one of the walls of said locking link, a knob formed on an upper surface of said locking link, and a first projection extended from a bottom surface of said locking link; and a knob spring being disposed to have one end of said knob spring to be supported on said locking link.

18. The docking apparatus according to claim 16, with said separating means comprising:

a link pusher assembled movably with said locking link, said link pusher having a second projection on one end of said link pusher, a first extended portion on the other end of said link pusher, and a connecting hole receiving said first projection on a center portion of said link pusher;

a link having a link pusher connecting hole receiving said second projection, a pivot pin mounting hole receiving a pivot pin formed to project from an inner surface of said housing, an eject finger, and a spring hanger; and a link spring hanging on said spring hanger at one end of said link spring and secured on said housing at the other end of said link spring.

19. The docking apparatus according to claim 16, with said pushing means comprising:
   a pusher mount being formed in said housing;
   a pusher being assembled movably with said pusher mount, said pusher having a pushing member formed on one end of said pusher, and a second extended portion formed on the other end of said pusher; and
   a pusher spring being disposed on said second extended portion to have one end of said pusher spring to be supported on said pusher mount.

20. A portable computer comprising:
   a main body having a keyboard and a monitor;
   a docking station connected with said main body for receiving peripheral devices; and
   a docking apparatus disposed in said docking station comprising:
      means for engaging or releasing said peripheral device in or from a locking state in cooperation with corresponding locking portion of said peripheral device,
      means for separating a connector of said peripheral device from a mating connector in said docking station when said peripheral device is released; and
      means for pushing out said peripheral device to an easily separable or removable position when or after said connector of said peripheral device is separated from said mating connector in said docking station.

21. The portable computer according to claim 20, with said engaging or releasing means comprising:
   a knob mount formed on said inner surface of said docking station;
   a locking link assembled movably with a knob mount on said docking station, said locking link having a hook formed in a wall of said locking link, a knob formed on an upper surface of said locking link, and a first projection extended from a bottom surface of said locking link; and
   a knob spring disposed to have one end of said knob spring to be supported on said locking link.

22. The portable computer according to claim 20, with said separating means comprising:
   a link pusher being assembled movably with said locking link, said link pusher having a second projection on one end of said link pusher, a first extended portion on the other end of said link pusher, and a connecting hole receiving said first projection on a center portion of said link pusher;
   a link having a link pusher connecting hole receiving said second projection, a pivot pin mounting hole for receiving a pivot pin formed to project from an inner surface of said docking station, an eject finger, and a spring hanger; and
   a link spring hanging on said spring hanger at one end of said link spring and secured on said docking station at the other end of said link spring.

23. The portable computer according to claim 20, with said pushing means comprising:
   a pusher mount being formed in said docking station;
   a pusher being assembled movably with said pusher mount, said pusher having a pushing member formed on one end of said pusher and a second extended portion being formed on the other end of said pusher; and
   a pusher spring disposed on said second extended portion to have one end of said pusher spring to be supported on said pusher mount.

24. A method, comprising the steps of:
   moving a locking link by switching a knob, said locking link movable within a knob mount, said knob mount being formed on an inner surface of a housing for the docking of at least one peripheral device of a computer, said knob mount accommodating said knob and said locking link, a pivot pin projecting from said inner surface of said housing, said link pusher being movable with said locking link;
   moving said first projection of said locking link from a first end portion of an elongated connecting hole of said link pusher to a second end portion of the elongated connecting hole, said moving of said first projection compressing a knob resilient member to a minimized length, said knob resilient member coupled with said knob;
   pushing a second projection of said link pusher to make a link to be rotated on said pivot pin, said link having a link pusher connecting hole receiving said second projection, said link coupled with a link resilient member having a resilient force away from said knob mount;
   pushing by an eject finger of said peripheral device in a direction away from said housing as said link is rotated, said eject finger being a portion of said link, said eject finger pivoting about said pivot pin;
   pushing said peripheral device by a pusher of a pushing member;
   separating said peripheral device from said housing and ejecting a portion of said peripheral device outside of said housing; and
   returning elastically to a beginning state of said locking link and said link by an elastic force of said link resilient member and said knob resilient member when said peripheral device is ejected away from said housing, said beginning state being a position of said locking link and said link when said first projection of said locking link is disposed at a first end portion of the elongated connecting hole.

25. The method according to claim 24, with said link resilient member being a torsion spring.

26. The method according to claim 24, with said link resilient member being a coil spring.

27. The method according to claim 24, with said first projection of said locking link moving within said knob mount a distance equal to the length of the elongated connecting hole.

* * * * *